(12) United States Patent
Wang

(10) Patent No.: US 7,073,664 B2
(45) Date of Patent: Jul. 11, 2006

(54) SELF-ILLUMINATED STORAGE AND CARRYING CASE

(76) Inventor: Richard W. Wang, 12523 Scully Ave., Saratoga, CA (US) 95070

( * ) Notice: Subject to any disclaimer, the term of this patent is extended or adjusted under 35 U.S.C. 154(b) by 194 days.

(21) Appl. No.: 10/463,621

(22) Filed: Jun. 18, 2003

(65) Prior Publication Data

US 2004/0256257 A1 Dec. 23, 2004

(51) Int. Cl.
*B65D 85/57* (2006.01)
*A45C 15/06* (2006.01)

(52) U.S. Cl. .................... 206/308.1; 362/156; 362/253

(58) Field of Classification Search ........... 206/308.1, 206/309–313; 362/43, 84, 98, 99, 184, 190, 362/154, 156, 253, 611, 612, 634; 281/29, 281/21.1, 31, 36–38; 40/451–452; 402/79
See application file for complete search history.

(56) References Cited

U.S. PATENT DOCUMENTS

| | | | | |
|---|---|---|---|---|
| 4,680,681 A | * | 7/1987 | Fisherman et al. | ............ 362/98 |
| 5,460,275 A | * | 10/1995 | Ladwig | ........................ 211/40 |
| 5,567,054 A | * | 10/1996 | Dalgleish | .................... 362/156 |
| 5,639,156 A | * | 6/1997 | Broxson | ..................... 362/156 |
| 6,106,015 A | * | 8/2000 | Udwin et al. | ............ 206/308.1 |
| 6,186,321 B1 | * | 2/2001 | Eskandry | ................. 206/308.1 |
| 6,637,907 B1 | * | 10/2003 | Levy | ........................... 362/253 |
| 6,679,376 B1 | * | 1/2004 | Chen | ....................... 206/308.1 |

* cited by examiner

*Primary Examiner*—Luan K. Bui
(74) *Attorney, Agent, or Firm*—Michael L. Harrison

(57) ABSTRACT

A self-illuminated storage and carrying case for storage and transportation of generally laminar stored objects is described. The case includes at least one, but usually several, storage sheets, each sheet having pockets which are generally inclusive of the outline of the stored objects and adapted to retain the objects securely and in position. The pockets are adapted to allow any matter printed on the stored object to be read. Each sheet is secured by one edge into a cover having a front and back portion, and is retained between the front and back covers. On the non-secured edges of at least some of the sheets, illuminating elements having a generally cable-like form factor are affixed. The illuminating elements may be electroluminescent filaments, fiber optic strands, or other illuminating elements of similar form. The light from each illuminating element is caused to fall edgewise onto the sheet to which it is affixed, and to fall onto the broad surface of adjacent sheets, thereby illuminating the surface of those sheets and the contents of their pockets. The case is particularly useful in low light situations where increasing the general illumination may be impractical or undesirable. Additionally, the illuminated edges provide a novel, striking, ornamental effect.

18 Claims, 3 Drawing Sheets

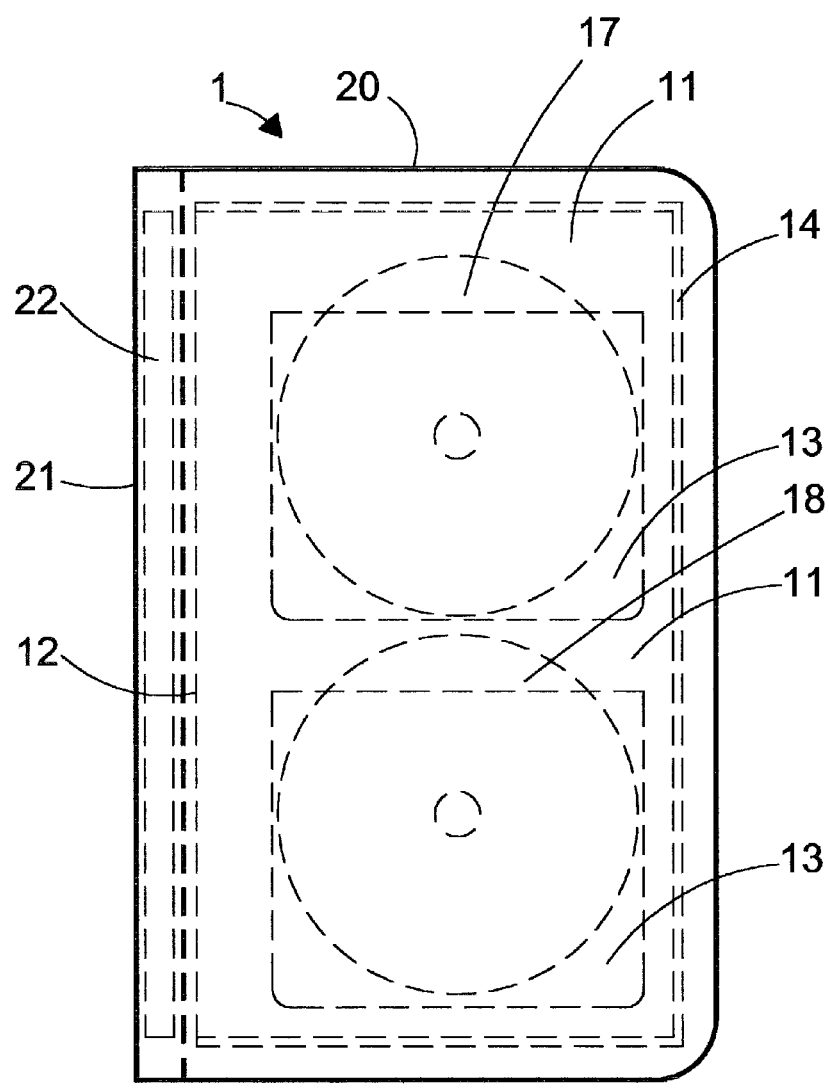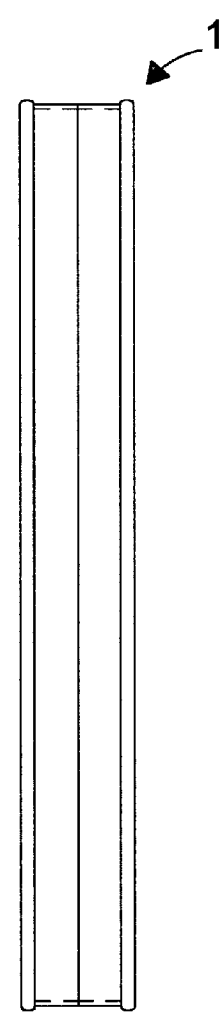
Fig. 3  Fig. 4

SELF-ILLUMINATED STORAGE AND CARRYING CASE

BACKGROUND OF THE INVENTION

1. Field of the Invention

The present invention relates to storage and carrying cases, and in particular to storage and carrying cases having self-contained illuminating means for illuminating the contents of the cases.

2. Prior Art

Disc players of various formats and configurations, for playing prerecorded music and other audio and video programs, are commonly found and used in both stationary living environments and in automobiles. To employ the players, it is of course necessary to provide a selection of discs containing the desired programs. If the user seeks variety in the programs available, a large number of discs may be required. The discs in turn are required to be carried to the vicinity of the player and at least temporarily stored there.

Most players are capable of playing a single disc that is manually selected and inserted into the player. The automobile style of player is usually mounted in the dashboard inside the passenger compartment, so that when it is desired to play a specific disc, the disc may be inserted through the front panel of the player. This single play function may be the sole means of playing a disc, or may be provided in conjunction with and as a supplement to an automatic disc changer. In the case of players having automatic disc changing capability, the changer may be located remote from the in-dash player, and may require that a stack of discs be selected and installed before beginning a trip. The changer then changes discs automatically in response to user requests. There is nonetheless a need to change the content of the stacks from time to time, and therefore a need for storage and carrying of discs to the vicinity of the changer.

Whether the player in use is a single disc player or an automatic changer, to use either type of player, discs containing the desired programs must be transported and stored in the vicinity of the player. For automobile mounted players, discs containing the desired programs must be transported to and stored in the automobile. Indeed, for most convenience, the discs must be stored inside the passenger compartment, available within the reach of the compartment occupants and in the vicinity of the player. If it is desired to have a great number of individual program choices, numerous discs will be carried. In consequence, there will be greater potential difficulty in locating the exact disc desired.

It is well known to the prior art to use storage and carrying devices to store generally flat objects—such as compact discs, digital video discs, and similar data storage discs of the type that would be used in stationary, portable or automobile mounted players. These storage and carrying devices are frequently in the form of a small case, comprised of a book-like folder in which individual, pocketed storage sheets are secured by a common edge, as are pages in a book. Each of the sheets contained in the book has pockets adapted to the form of the stored objects, enabling it to securely contain one or more of the stored objects on each individual sheet. It is common that such storage cases contain multiple-pocket sheets. It is also common to store and carry other generally flat objects, including printed matter, such as individual printed pages, business cards, display cards, and the like, in similar storage cases.

It is also well known to use transparent or translucent sheets so that the contents of the pockets are visible to the user without necessitating their removal from the storage and carrying case.

To make the desired selection, the user of the discs must be able to discern the graphic content, or to read the titles and insignia printed on the faces of the discs. Selection of a particular disc under adverse lighting conditions is especially difficult if the specific objects being sought are labeled with small fonts, as may be necessitated by the limited physical space available on the object itself.

The prior art storage and carrying case, of which many varieties are on the market, works well enough in ordinary bright illumination, such as is found outdoors in daylight hours, and in normally lighted interiors. However, in low level lighting and in the dark, it is frequently difficult to locate the desired disc from among the many that may be stored.

In the past, the usual method of viewing the disc faces when the users and the discs are located in low ambient light has been to supply external lighting, usually local permanent or semi-permanent task lighting to supplement the low ambient light, or hand-held portable lighting, such as a flashlight. Inside a stationary living structure, such as a home or apartment, the overall level of the ambient light may also be raised, or a separate task light provided to make the graphics or text readable. In an automobile, the user may rely on the passenger compartment lights, either dome or other passenger compartment lights.

As the use of these discs has become more common in automobiles, the potential for distraction from the more important task of safely operating the vehicle has become an issue. In an automobile, it is preferred that the user stop the car before making a selection from the storage case.

In other low light situations, though the use of an external light does not provide the same safety issue as would use in a moving automobile, it is an inconvenience nonetheless.

The previous method of using the dome or under-dash passenger compartment lights can be distracting to an automobile driver. Use of a portable external light is even more distracting, perhaps requiring that a driver's free hand be used both to hold the light and to position the stored objects for viewing. Relying on supplemental lighting in the more benign living space environment poses no safety issue, but may be less convenient than self-contained illumination, which also has the virtue of maintaining a low ambient light environment, should that be desired for decorative or atmospheric effects.

The present invention provides a solution to these problems by incorporating the use of lighting means onto the individual sheets in which each stored disc is contained. The invention thereby provides self-illuminating storage, in a compact case that has a plurality of storage positions illuminated by the adjacent lights, eliminating some of the disadvantages of the usual method of viewing the disc labels in low ambient light.

Though many examples of storage and carrying cases exist in the prior art, most of the prior art storage and carrying cases do not aim to achieve, and are not designed to allow for self-illumination of the contents. However, some which do have this aim have appeared. U.S. Pat. No. 4,914,545, issued on Apr. 3, 1990 to Price, discloses a lighting device suitable for illuminating cassette cases stored in files in a rectangular container. U.S. Pat. No. 5,521,802, issued on May 28, 1996 to Edington, aims to solve the display and readability problem by providing a lighting means that illuminates the "jewel cases" in which the discs are stored, but not the discs themselves.

It is also well known in the prior art to use small battery powered lighting devices for illuminating and locating keys, and for assisting in use of the keys in their associated locks. U.S. Pat. No. 6,409,360 B2, issued on Jun. 25, 2002 to Contant et al., and U.S. Pat. No. 6,533,436 B2, issued on Mar. 18, 2003 to Krietzman et al., disclose small lighting devices for carrying in purses or pockets, and the like, and which serve to illuminate the task while manually selecting objects from among a plurality of articles in the container. These devices do not however provide for storage of the discs or the like within the case, and would not in any case illuminate the discs if they were contained therein.

A need exists therefore for a storage and carrying case having a simple construction which allows the user to find and select for use the desired copy of the disc being sought, even though the case and its contents are located in less than adequate lighting conditions.

SUMMARY OF THE INVENTION

It is one object of the present invention to provide a storage and carrying case for generally flat objects that contains its own source of illumination.

It is another object of the present invention to provide a storage and carrying case, having storage sheets for generally flat objects, that illuminates the broad surface of each storage sheet when the sheets are opened.

It is another object of the present invention to provide a storage and carrying case having an illuminating source that is compact and self-contained.

It is another object of the present invention to provide a storage and carrying case that is economical in construction and readily adaptable to storage of various generally flat objects.

It is another object of the present invention to provide a storage and carrying case that is a rugged, durable and relatively foolproof design.

It is another object of the present invention to provide a storage and carrying case that is relatively easy to use in low light conditions.

It is another object of the present invention to provide a storage and carrying case that is illuminated without requiring use of a second hand to hold an external light.

It is another object of the present invention to provide a storage and carrying case that is readily manufacturable.

These and other objects of the present invention are accomplished by providing an improved design of storage and carrying case for storage and transportation of generally flat stored objects, which allows users to read labels on stored flat objects, such as compact discs, digital video discs, flat magnetic data storage disks, and the like, in limited or unfavorable lighting. The case preferably includes a plurality of generally transparent or translucent storage sheets, each sheet having pockets which are adapted to retain the objects securely in position. The sheets are secured by one edge on each sheet into a cover having a front and back portion, and are retained between the front and back covers. On the non-secured edges of at least some of the sheets, illuminating elements having a generally cable-like form factor, are affixed. The illuminating elements may be electroluminescent filaments, fiber optic strands, or other illuminating elements of similar, elongated form. Preferably the illuminating elements are affixed to the periphery of the individual sheets within the case. Current is applied as needed, when it is desired to energize the illuminating elements. For that purpose, the storage and carrying case is provided with a switchable power source in the form of a dry cell storage battery, thereby producing the current necessary to produce light.

The light from each illuminating element is caused to fall edgewise onto the sheet to which it is affixed, and to fall onto the broad surface of adjacent sheets, thereby illuminating the surface of those sheets and the contents of their pockets. The case is particularly useful in low light situations where increasing the general illumination level may be impractical or undesirable, and provides in addition a novel, ornamental appearance.

Other objects, features, functions and advantages of the present invention will become known from study of this specification and the accompanying drawings.

BRIEF DESCRIPTION OF THE DRAWINGS

FIG. 3 is a plan view of the storage and carrying case in accordance with the present invention, showing the spine of the case and the position of the sheets in the interior of the case, when the case is fully closed.

FIG. 4 is a side view of the storage and carrying case in accordance with the present invention, showing the case fully closed.

DESCRIPTION OF THE PREFERRED EMBODIMENT

Figure 1:
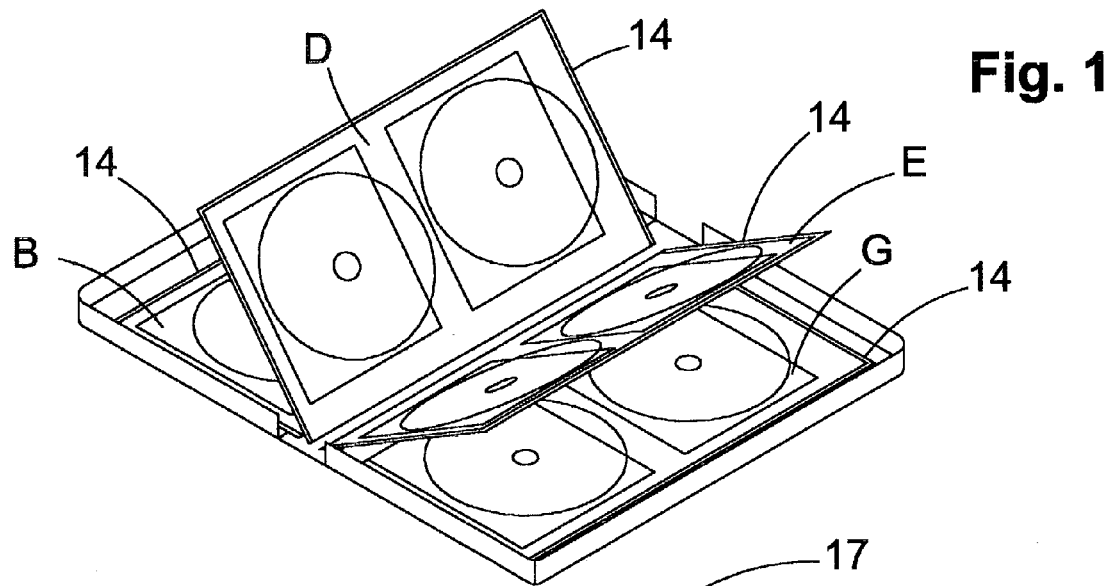
FIG. 1 is a perspective view of the storage and carrying case of the present invention, showing several storage sheets containing stored objects such as compact discs, and showing two sheets in the position that the user might place them during use.

Referring now to the drawings, in which like characters of reference designate like parts in those figures of the drawings in which they occur, FIG. 1, FIG. 3, FIG. 4 and FIG. 5 show views of a complete storage and carrying case 1 in accordance with the present invention. FIG. 2 shows a single page of a storage sheet 11 that is typical of the type of storage sheet preferably to be employed. It will be useful to now refer to FIG. 1, FIG. 2, and FIG. 3 in connection with the following discussion.

In the figures, storage sheets 11, are made of a transparent or a translucent material, in accordance with considerations described below. The sheets 11 are affixed together in a cooperating group with the other sheets 11 by means of a common edge 12, so that, as affixed, the case 1 and its enclosed sheets 11 are configured similarly to the cover and pages of a book.

In an effective embodiment, the sheets 11 will preferably be employed in multiples in each case 1, multiplied as necessary in order to achieve the desired capacity.

In FIG. 2, the sheet 11 is shown as being adapted for storage of compact discs ("CDs") or digital video discs ("DVDs"), or similar media (hereinafter "discs"), and has pockets 13 dimensioned to accommodate that media. The pockets will be preferably made to have a snug but slidable fit to the objects that are being stored, as determined by well known practices and techniques.

On the periphery of the sheet 11, preferably extending around the entirety of the periphery of the sheet 11 edges that are not being used for attachment, is an illuminating element 14. Any elongated light-emitting device, or means, which provides light in response to application of electrical current might be employed. The criteria for selection include that the device must be sufficiently rugged and flexible. In addition, it must be reasonably efficient electrically; the current consumption must be compatible with reasonable battery life in a consumer product.

A suitable selection for the illuminating elements 14 would be cable-like electroluminescent filaments, such as those described in U.S. Pat. No. 5,869,930, issued on Feb. 9, 1999 to Baumberg, et al. In the preferred embodiment the illuminating elements 14 employed are such electroluminescent filaments, for the reason that these products well meet the above selection criteria.

Other lighting devices may be employed in lieu of the electroluminescent filaments 14. For example, optical waveguide filaments lighted by bright light-emitting diodes ("LED"s), and having sides treated to allow controlled, preferably uniform emission of light from the sides along the length of the filament, may replace the electroluminescent filaments 14. Similarly, multiple individual LEDs connected in a string located at the periphery of the sheets 11 and connected to the current source could be employed.

The sheet 11 shown in FIG. 2 as an example of the preferred embodiment provides for storage of discs 17 and 18 in two pockets 13 on the side of the sheet shown, and two similar pockets on the other side of the sheet. It will also be understood however that the sheet 11 could be made with pockets on only one side. Two-sided storage is preferable because it makes maximum use of the electroluminescent filaments 14, since one strand of the electroluminescent filaments can serve to directly illuminate the disc faces contained in the two adjacent sides of the sheets 11, instead of only one as would be the case if only one side of the sheet 11 is used.

The light from each illuminating element 14 is caused to fall edgewise onto the sheet 11 to which it is affixed, and to fall onto the broad surface of adjacent sheets, thereby illuminating the surface of those sheets 11 and the contents of their pockets 13.

Figure 2:
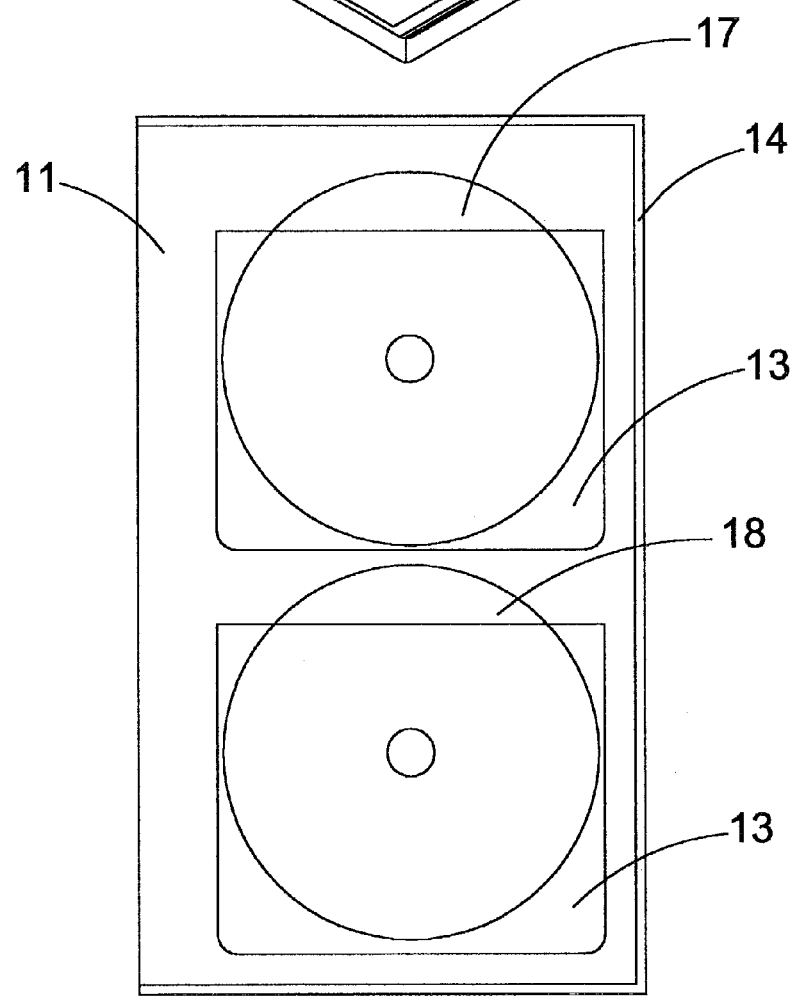
FIG. 2 is a plan view of a sheet of the storage and carrying case, showing the lighting element attached to the periphery of the sheet in accordance with the present invention.
Figure 5:
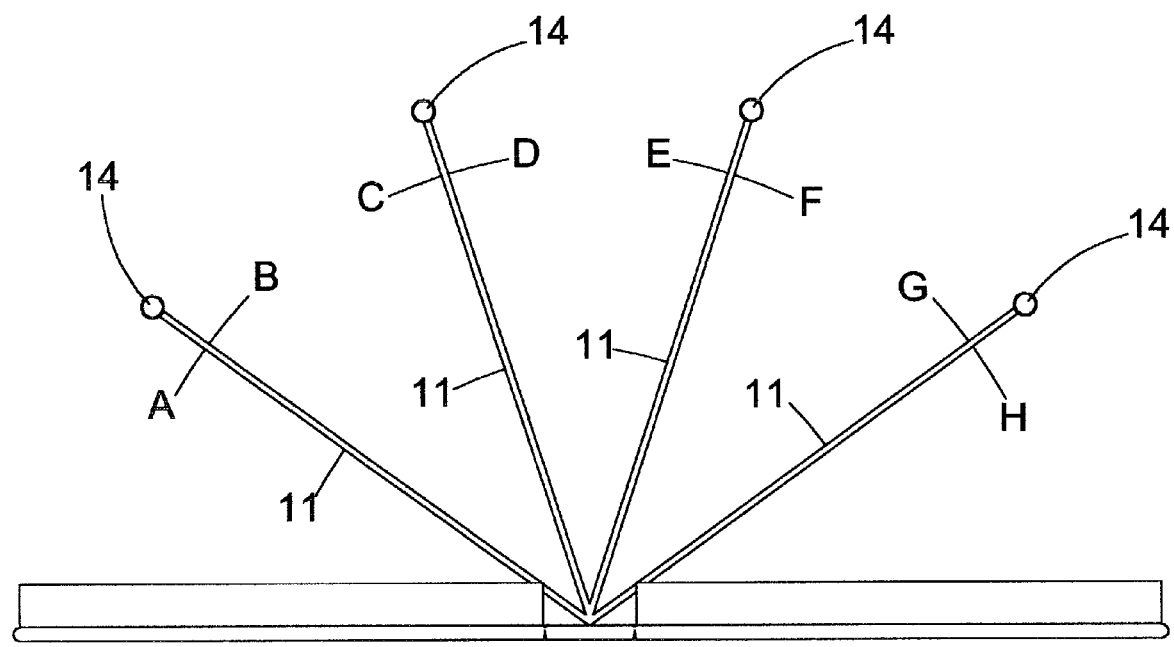
FIG. 5 is an end view of the storage and carrying case in accordance with the present invention, showing the case fully opened and with several sheets in position for viewing the stored objects.

Referring now particularly to FIG. 1 and FIG. 5, the illumination patterns of the storage case 1 may be understood, as applied to individual sheets 11. In FIG. 1 and FIG. 5 there are shown four sheets 11, all of which are depicted as having storage on both sides. Thus, a given sheet 11 has storage pockets 13 to contain four discs. Of course more discs per sheet may be accommodated by making the sheets larger, and providing them with additional pockets 13. The sheets 11 are all identical to each other, and identical to the example shown in FIG. 2.

For convenient reference, the sides of the four sheets 11 have been labeled A, B, C, D, E, F, G and H. Sides A, C, F, and H indicate the sides that are away from the view of the viewer, and therefore invisible in FIG. 1. The sides viewable in FIG. 1 as well as those shown in FIG. 5 in an end view, will be used to illustrate the concepts.

When it is desired to use the self-illuminating feature of the case, for example in a low light environment, power is applied to the electroluminescent filaments 14 as described above. With power applied, all electroluminescent filaments 14 immediately emit light, the light pattern being distributed in all directions around the axis of the strand. Immediately adjacent to a given strand, on the sheet to which it is attached, the strand provides some illumination through means of relatively unpredictable scattering and conduction of the light edgewise through the sheet. A more important component of illumination however is the direct illumination provided by a given strand to the face of the sheets, and the discs contained therein, that are adjacent to the sheet on which the strand is located.

To use specific examples, consider the light being emitted from the electroluminescent filament 14 attached to the sheet 11 that contains sides C and D. That light is emitted in all directions around the longitudinal axis of the strand, including light that travels essentially parallel to the surface of side C and the surface of side D the sheet. As noted above, since some of the light will be trapped within the pocket 13, between the disc and the outer surface of a pocket 13, some of the light with fall on the disc contained within the sheet to which the electroluminescent filaments 14 is attached.

The largest component of the illumination however falls on the surface of an adjacent sheet 11, the sheet having sides E and F. Light is emitted directly onto the broad surface of side E from the electroluminescent filaments 14 attached to the sheet 11 having the C and D sides. Similarly, light is emitted directly onto the broad surface of side D from the electroluminescent filaments 14 attached to the sheet 11 having the R and F sides.

In all, in the case 1 configured as shown in FIG. 1 and opened as shown in FIG. 1 and FIG. 5:

side B and side E are illuminated mainly from the electroluminescent filaments 14 on the sheet 11 having sides C and D;

side C is illuminated mainly from the electroluminescent filaments 14 on the sheet 11 having sides A and B;

side D and side G are illuminated mainly from the electroluminescent filaments 14 on the sheet 11 having sides E and F, and;

side F is illuminated mainly from the electroluminescent filaments 14 on the sheet 11 having sides G and H.

The present invention is intended to be added to conventional cases for storage and carrying of compact discs and similar flat objects, including magnetic tape cassette protective casings, as well as to be incorporated in entirely new ornamental designs.

An advantageous position for placement of the power source is the spine 21 of the cover 20. Suitable structure may be added to the inside of the spine to form a battery compartment 22 containing one or more dry cell batteries as a source of electrical energy.

A switch may be added in series with the power source in order to conserve battery life. In a more expensive version of the present invention, more elaborate switching means may be added, providing such functions as a timer mode for turning the illumination "off" after a short period to conserve battery life, or simultaneous flashing of all strands, or patterned flashing alternating among strands, and the like, for additional decorative effects and additional novelty appeal.

The design of the lighting strands and the circuitry required to support them is relatively simple and inexpensive in the preferred embodiment in order to allow competitive pricing in a market in which price is a key determinant of consumer choice.

Although the description above is primarily concerned with the utilitarian function of providing access and readability in a low light environment, it will also be appreciated that decorative display is inherent in the present invention and that it is useful for that purpose, whether alone or in combination with its low light readability improvement; the present invention not only allows a viewer to read labeling, it also provides the user with an attractive, novel glowing outline of each sheet in the collection, which may appeal to the user seeking a different appearance in storage cases, whether or not the case is being used in sufficient ambient light Although the present invention has been described in connection with an example of the preferred embodiment thereof, it will be appreciated by those skilled in the art that the present invention is not limited merely to those embodiments shown. Many variations and modifications can be made without departure from the spirit of the present invention. For example, the materials, the particular shapes, and the arrangement and affixation of the sheets may be varied. In one of the many possible variations of shape, the sheets may be linked edge to edge, may have folds or pleats that define each sheet, and may have the illuminating elements 14 attached to the folds or pleats. Such a configuration may be attached to a cover containing the sheets at the extreme ends of the linked sheets. It may also be attached to the cover at any point along the length of the linked sheets. The linked sheets may also be formed as a continuous web, with stored object retaining means applied to the web.

If translucent, the material from which the sheets 11 are made, regardless of their shape, should be sufficiently light transmitting such that light can penetrate it, to illuminate the stored objects, and return with sufficient intensity to be readily seen by the user. The degree of translucency required may be readily determined in practice, by experimental means, to optimize the degree of translucency to the strength of the light source. Although the image seen by the user viewed through the translucent sheet will be partially obscured by the sheet, the legibility of the characters or of the graphic images on the CDs will be sufficient, provided the sheet lies flat against the CD.

Although it is generally preferable from the standpoint of function to locate the illuminating elements 14 at the periphery of the sheets 11, it will be appreciated that for reasons of aesthetics, convenience of design, or economy, the elements may be placed elsewhere on the sheet.

Although the preferred embodiment shown is for generally flat objects, and the utility of the invention is at its greatest for objects that may be stored in a more or less flat, face to face position, the principle of applying the illuminating element to the periphery of the storage sheets will also work for objects that are not generally flat, and are more bulky than compact discs. This may require that the storage and carrying case itself be modified.

These and other variations are specifically contemplated. Accordingly, variation of the preferred form and of the particulars of structure and materials described as preferred for the present invention may be undertaken without departure from the scope of the invention, which is defined only by the claims which follow.

What is claimed is:

1. A self-illuminating storage case for retrievably storing stored objects, comprising, in operative combination:
a plurality of storage sheets, each of said sheets having retaining means for retaining a stored object;
means for retaining the storage sheets within the case by attachment of at least one edge;
illuminating means, attached to the periphery of at least one of the sheets such that illumination falls onto adjacent sheets.

2. The self-illuminating storage case of claim 1, wherein the retaining means for retaining a stored object allows the object to be viewed while being retained.

3. The self-illuminating storage case of claim 1, further comprising an openable cover for enclosing the storage sheets.

4. The self-illuminating storage case of claim 3, further comprising a power supply for powering the illuminating means.

5. The self-illuminating storage case of claim 4, wherein the power supply is mounted within the case.

6. The self-illuminating storage case of claim 3, further comprising switching means for controlling the application of power from a power source to the illuminating means.

7. The self-illuminating storage case of claim 4, further comprising switching means for controlling the application of power from the power supply to the illuminating means.

8. The self-illuminating storage case of claim 3, further comprising switching means cooperating with and acting in response to movement of the cover for controlling the application of power from a power source to the illuminating means.

9. The self-illuminating storage case of claim 4, further comprising switching means cooperating with and acting in response to movement of the cover for controlling the application of power from the power supply to the illuminating means.

10. The self-illuminating storage case of claim 1, wherein the retaining means on the storage sheets has an exterior shape that generally conforms to the shape of the stored objects.

11. The self-illuminating storage case of claim 1, wherein at least one storage sheet is retained within the case by at least one edge and the illuminating means is attached to at least one edge of the storage sheet.

12. The self-illuminating storage case of claim 1, wherein the illuminating means has a cable-like form factor.

13. The self-illuminating storage case of claim 1, wherein the illuminating means has a ribbon-like form factor.

14. The self-illuminating storage case of claim 1, wherein the illuminating means is an electroluminescent filament.

15. The self-illuminating storage case of claim 1, wherein the illuminating means is an optical fiber filament.

16. The self-illuminating storage case of claim 1, wherein the illuminating means is an optical fiber filament supplied with light from a light source.

17. The self-illuminating storage case of claim 1, wherein the illuminating means is an optical fiber filament supplied with light from at least one light emitting diode.

18. The self-illuminating storage case of claim 1, wherein the illuminating means is a plurality of light emitting diodes.

* * * * *